(12) United States Patent
McCauley

(10) Patent No.: US 7,900,430 B1
(45) Date of Patent: Mar. 8, 2011

(54) QUICK CONNECT COUPLING LINK

(75) Inventor: John J. McCauley, Winona, MN (US)

(73) Assignee: Peerless Chain Company, Winona, MN (US)

( * ) Notice: Subject to any disclaimer, the term of this patent is extended or adjusted under 35 U.S.C. 154(b) by 0 days.

(21) Appl. No.: 12/616,263

(22) Filed: Nov. 11, 2009

Related U.S. Application Data

(60) Provisional application No. 61/116,974, filed on Nov. 21, 2008.

(51) Int. Cl.
*F16G 15/04* (2006.01)
(52) U.S. Cl. .................................. 59/86; 59/85
(58) Field of Classification Search ................ 59/78, 84, 59/85, 86
See application file for complete search history.

(56) References Cited

U.S. PATENT DOCUMENTS

| | | | |
|---|---|---|---|
| 30,019 A | 9/1860 | Yost | |
| 39,239 A | 7/1863 | Packer | |
| 105,921 A | 8/1870 | Dexter | |
| 195,940 A | 10/1877 | Martin | |
| 310,301 A | 1/1885 | Miller | |
| 333,095 A | 12/1885 | Munro | |
| 691,433 A | 1/1902 | Baker | |
| 923,722 A | 6/1909 | Smith | |
| 1,044,792 A | 11/1912 | Levy | |
| 1,139,761 A | 5/1915 | Hardisty | |
| 1,269,733 A | 6/1918 | Nelson | |
| 1,286,501 A | 12/1918 | Bauer | |
| 1,447,064 A | 2/1923 | Cousins | |
| 1,454,335 A | 5/1923 | Prendergast | |
| 1,588,533 A | 6/1926 | Elzey | |
| 1,831,765 A | 11/1931 | Gouverneur | |
| 2,259,217 A * | 10/1941 | Stevenson | 59/86 |
| 2,347,088 A | 4/1944 | Dock | |
| 2,524,935 A | 10/1950 | Sköld | |
| 2,550,038 A | 4/1951 | Brown | |
| 2,621,471 A | 12/1952 | Dock | |
| 2,771,768 A | 11/1956 | Tudor | |
| 3,292,401 A | 12/1966 | Van Meter | |
| 3,330,106 A | 7/1967 | Spilhaug | |
| 3,707,072 A | 12/1972 | Elsässer | |
| 4,095,416 A * | 6/1978 | Issard | 59/86 |
| 6,243,929 B1 | 6/2001 | Curwood | |
| 6,637,182 B1 | 10/2003 | Chang | |

\* cited by examiner

*Primary Examiner* — David B Jones
(74) *Attorney, Agent, or Firm* — Moore & Hansen, PLLP

(57) ABSTRACT

A link assembly comprising a body and a closure. The body is generally c-shaped and includes two ends that confront each other in a spaced-apart relation. Each end of the body is provided with two or more external, helical thread sets that extend from each end towards the body. The closure includes a main section with first and second ends and a threaded interior surface that extends the length of the closure member. The treaded interior surface of the closure member engages and mates with each of the thread sets at the ends of the body. The closure is movable between a first or open position, which exposes a gap between the ends of the body, and a second or closed position that closes the gap between the ends of the body. Preferably, the closure member can be moved between the first and second positions in approximately five revolutions.

15 Claims, 3 Drawing Sheets

QUICK CONNECT COUPLING LINK

RELATED APPLICATIONS

This application claims priority to and the benefit of provisional patent application No. 61/116,974, filed on Nov. 21, 2008, which is hereby incorporated herein by reference.

FIELD OF THE INVENTION

This application relates generally to connecting link assemblies. More particularly, this application relates to a link assembly including two spaced apart ends and a coupler that connects the ends together. Even more particularly, this application relates to a link assembly, wherein the ends and the coupler have complimentary threads and the coupler can be threaded onto and off of the opposing threaded end to close and open the link.

BACKGROUND OF THE DISCLOSURE

Assemblies of chain segments are used in many primary connection applications that can include securing and hoisting. Other common applications include serving as a secondary connection to a primary connection. An example of a secondary connection is a back-up connection between a tow vehicle and a trailer. The purpose of these secondary chain assemblies is to prevent complete separation of the towed and towing vehicles in the event of disengagement of the primary connection.

The chain assemblies typically comprise a plurality of toroidally-shaped chain segments that are linked together during manufacture. Sometimes, however, it becomes necessary to join chain segments together, to join a chain to another object, or to replace a missing link. This is often achieved by using a closeable link to join the pieces together.

The present invention addresses problems and limitations associated with the prior art.

SUMMARY OF THE INVENTION

A preferred embodiment of a link assembly includes an elongated body having a center portion, a first end and a second end, with the first and second ends spaced apart from each other in a confronting relation. Each end has at least two helical threads. The link assembly further includes a coupler or closure member that is configured and arranged to engage the threads of the first and second ends of the body, respectively, as it moves between a first or retracted position and a second or closed position. The pluralities of threads are highly advantageous as this allows the coupler to quickly move up and down the threaded ends as the coupler as rotated, thus requiring fewer revolutions to open and close the link assembly as compared with the prior art links. In further preferred embodiments, the threads of the respective ends of the body each have a lead length that is greater than their pitch length. Even more preferred, the threads of the ends of the body have a lead angle that is greater than about 3.0 degrees and less than about 11.0 degrees.

The preferred link assemblies are advantageous because the speed at which the link can be opened or closed is far greater than that of conventional prior art link assemblies. This is important in terms of safety because link assemblies are often used in situations where the link assembly must be quickly opened or closed. The preferred link assemblies are advantageous because the link requires fewer coupler revolutions to open and close the link assembly without sacrificing strength. Fewer required revolutions can also reduce repetitive motion injuries. For example, link assemblies including ends each having two threads require half as many coupler revolutions to open and close the link assembly as a link assembly having ends with only a single thread. Link assemblies including three threads require one third fewer revolutions to open and close the link assembly as a link assembly having ends with only a single thread. Link assemblies including ends having greater than five threads can be achieved, however, less than five threads per end are preferred as it is believed that it will be difficult to rotate a coupler secured to an end including more than five threads.

These and other objectives and advantages of the invention will appear more fully from the following description, made in conjunction with the accompanying drawings wherein like reference characters refer to the same or similar parts throughout the several views. And, although the disclosure hereof is detailed and exact, the physical embodiments herein disclosed are merely examples that may be embodied in other specific structures. While preferred embodiments have been described, the details may be changed without departing from the claims.

DETAILED DESCRIPTION

Figure 1:
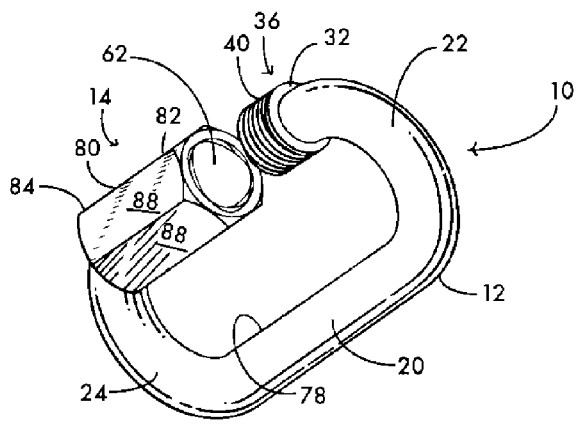
FIG. 1 is a perspective representation of an embodiment of a link assembly.

In a preferred embodiment, the link assembly of the present invention comprises a body 12 and a coupler or closure member 14 that is movably connected to the body. Generally, as shown, the body 12 is c-shaped and includes an elongated center portion 20, a first arcuate or curved portion 22, a second arcuate or curved portion 24, and enlarged ends 36, 38 with end surfaces 60, 62 that confront each other in a spaced apart relation so as to form a gap 64 therebetween.

Figure 2:
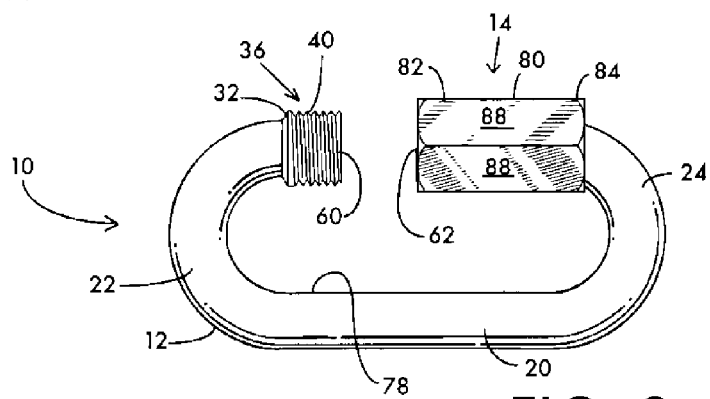
FIG. 2 is a side elevational view of the link assembly of FIG. 1.
Figure 3:
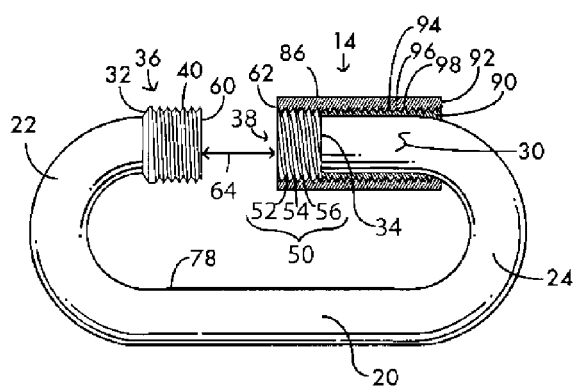
FIG. 3 is a side elevational view of the link assembly of FIG. 1, with the coupler or closure member shown in cross-section.

More specifically, and with reference to FIGS. 1-3, the center portion 20 of the body 12 is generally cylindrical and has a length of approximately 43-45 mm and a width of approximately 8-9 mm. The first arcuate or curved portion 22 extends from one end of the center portion 20 and the second arcuate or curved portion 24 extends from the other end of the center portion. The first arcuate or curved portion 22 is generally hemispherical and has a radius of approximately 19-20 mm. The end the first arcuate or curved portion 22 terminates in a first shoulder 32, from which an enlarged first end 36 extends about 8 mm and terminates in a first end surface 60. The enlarged first end 36 includes a first set 40 of external, parallel, helical threads that extend from the shoulder 32 to the end surface 60. Preferably, the first set 40 of threads include three helical threads 42, 44, 46 that extend generally from the shoulder 32 to the end surface 60. However, it is envisioned that the set may include as little as two and as many as five or more threads.

The second arcuate or curved portion 24 extends from the other end of the center portion 20. As with the first arcuate or curved portion 22, the second arcuate or curved portion 24 is generally hemispherical and has a radius of approximately 19-20 mm. The second arcuate or curved end 24 is provided with an elongated side portion 30 that has a length of about 15 mm, and which terminates in a second shoulder 34. A second enlarged end 38 extends about 7 mm from the second shoulder 34 and terminates in a second end surface 62. The enlarged second end 38 includes a second set 50 of external, parallel, helical threads that extend from the second shoulder 34 to the second end surface 62. Preferably, the second set 50 of threads includes three helical threads 52, 54, 56 that extend generally from the second shoulder 34 to the second end surface 62. However, it is envisioned that the set of threads 50 may include as little as two and as many as five or more threads. It should be noted that the number of threads in the second set 50 of threads should be equal to the number of threads in the first set 40 of threads.

Together the center portion 20, the first and arcuate or curved portions 22, 24, the elongated side portion 30 and the threaded ends 40, 50 form the c-shaped body 12 having a generally toroidally shaped interior 78 with a length to width ratio of approximately 3.25. The gap 64 formed between the first and second end surfaces 60, 62 is approximately 12-12.5 mm and is approximately 1.3 to 1.5 times greater than the width of the center portion 20 of the body 12.

The coupler or closure member 14 comprises an elongated main section 80 having a first end 82, a second end 84, an exterior 86, and an interior 90. More specifically, the main section 80 is generally cylindrically shaped and preferably has an exterior 86 with a plurality of longitudinal facets or flats 88 that provide gripping surfaces for a user of the link assembly 10. Preferably, there are six facets or flats 88 on the exterior surface 86. The interior 90 of the main section 80 is hollow along the length of the main section and is provided with a third set 92 of helical threads 94, 96, 98 that extends the length of the hollow interior and which is configured and arranged to engage and mate with the thread sets 40, 50 of the first and second ends 36, 38 of the body 12. It will be understood that the number of interior threads in the third thread set 92 of the coupler or closure member 14 should be equal to the number of threads in the first and second set of threads 40, 50 of the first and second ends 36, 38 of the body 12. In this embodiment, each thread set 40, 50, and 92 includes three helical threads. However, other embodiments may include matching thread sets having two, four or five helical threads per set.

As depicted, the coupler or closure member 14 is in the retraced or closed position where the first end 82 of the main section 80 is substantially coincident with the plane defined by the second end surface 62 of body 12. This defines the gap 64 between the first and second end surfaces 60, 62, which is approximately 12-13 mm. Preferably the gap width divided by the diameter of the center portion of the link has a ratio of approximately 1.3. In the open or retracted position, the main section 80 surrounds the elongated side portion 30 and also surrounds a portion of the second arcuate portion 24 of the body 12. As will be understood, the retractability is limited by the second arcuate portion 24 of the body 12.

Figure 4:
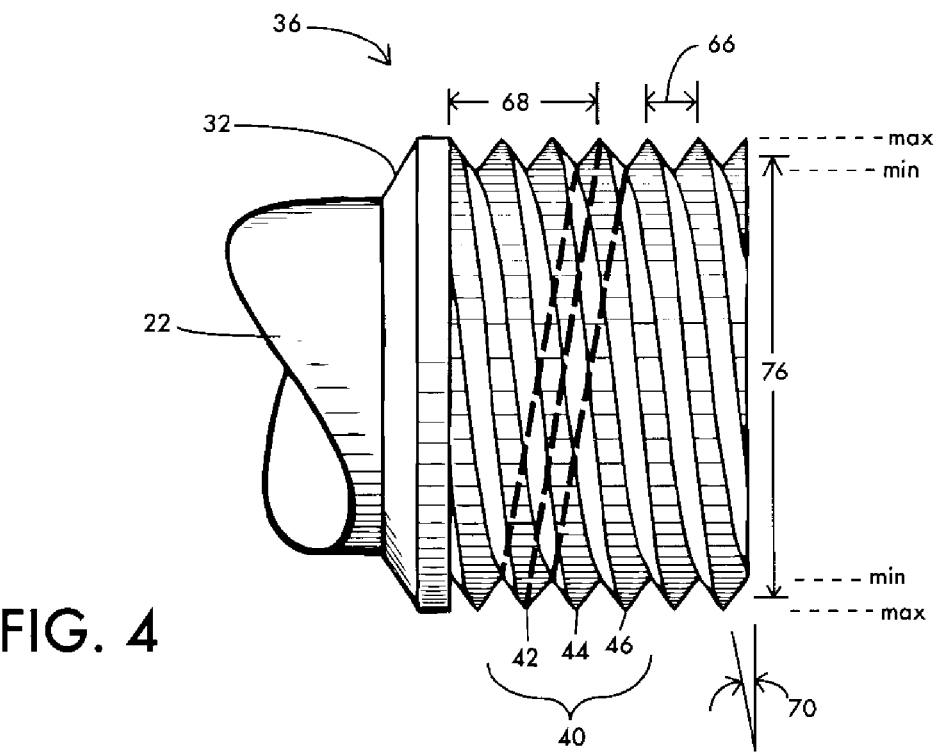
FIG. 4 is a partial, enlarged, side elevational view of a threaded end of the link assembly of FIG. 1.

FIG. 4 depicts the first enlarged end 36 of the preferred embodiment. As depicted, the first end 36 includes a first set 40 of helical threads 42, 44, 46, with each thread 42, 44, 46 extending from the first shoulder 32 to the end surface 60. There can be from 2 to 5 or more threads in the first set 40, but preferably, there are no more than five threads, even more preferably, there are three threads in the first set 40. Conventionally, adjacent threads 42 and 44, or 44 and 46 define the pitch 66 of the first end 36, while the axial distance that one of the threads 42, 44, 46 traverses during one revolution defines the lead length 68 of the respective thread. As shown, the lead length 68 is greater than the pitch length 66 by about a factor of about three. However, this ratio can be from approximately two to approximately five, for example. Alternatively, the angle (or lead angle) 70 of each thread 42, 44, 46 relative to the axial direction can be expressed by the lead length 68, the average thread diameter 76, and the trigonometric tangent function, where a lead angle 70 is the arctangent of the quotient of the dividend (lead length 68) over the divisor (pi times the average thread diameter 76). Using this equation, the lead angle 70 is greater than 3.0 degrees. Preferably, the lead angle 70 ranges from approximately 4.0 degrees to approximately 11.0 degrees. More preferably, the lead angle 70 ranges from approximately 6.0 degrees to approximately 6.6 degrees. The second, threaded end 38 and second thread set 50 are identical to the first threaded end 36 in terms of pitch length, lead length and lead angle and will not be discussed here in detail.

Figure 5:
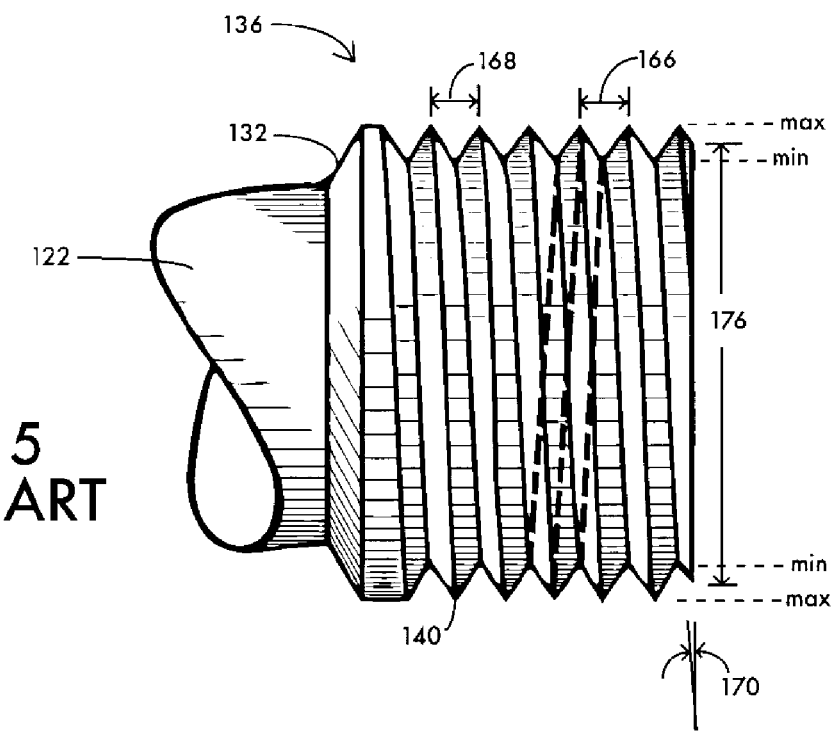
FIG. 5 is a partial, enlarged, side elevational view of a threaded end of a prior art closable link.

FIG. 5 depicts, in a prior art link 110, an arcuate portion 122 with a shoulder 132 and an enlarged end 136 that terminates in an end surface 160. The enlarged end includes only one helical thread 140 that extends to the end surface 160. Using the normal conventions of thread pitch and lead, the pitch 166 of this prior art link end is equal to the lead length 168 and the ratio of lead length to pitch is 1 (one). Alternatively, as previously discussed, the angle or lead angle 170 of the thread 140 relative to the axial direction can be expressed by the lead length 168, the average thread diameter 176, and the trigonometric tangent function, where a lead angle 170 is the arctangent of the quotient of the dividend (lead length 168) over the divisor (pi times the average thread diameter 176). This will result in a lead angle of approximately 2.2 degrees.

Figure 6A:
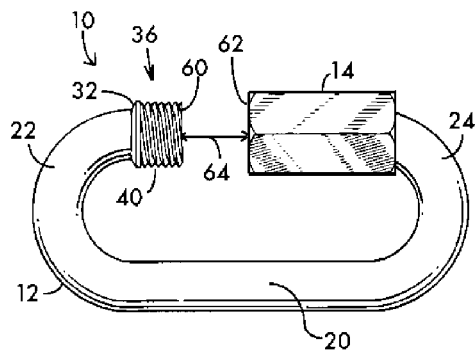
FIG. 6A is a side elevational view of the link assembly of FIG. 1 in a fully open first or retracted position.
Figure 6B:
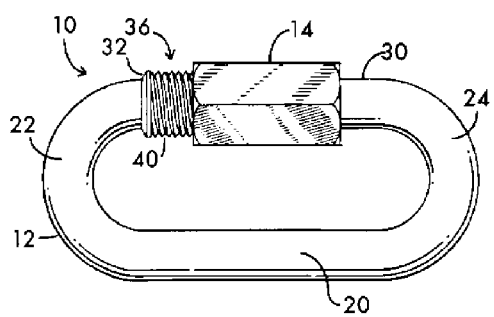
FIG. 6B is a side elevational view of the link assembly of FIG. 6A after the coupler has been rotated approximately three complete revolutions in a clockwise direction when viewed from the second arcuate end.
Figure 6C:
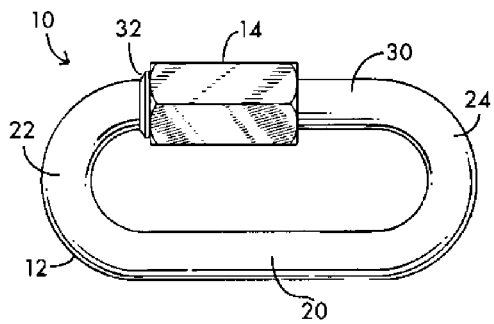
FIG. 6C is a side elevational view of the link assembly of FIG. 6A after the coupler has been rotated approximately five complete revolutions in a clockwise direction when viewed from the second arcuate end such that the link assembly is in the fully closed second or extended position.

FIGS. 6A-6C illustrate the preferred link assembly 10 of FIG. 1 in various stages of closure as the coupler 14 is rotated. More specifically, FIG. 6A illustrates the link assembly 10 wherein the coupler 14 is in its retracted or open position. Here, the gap 64 formed between end surfaces 60, 62 is unobstructed and fully accessible (approximately 12.0 mm to approximately 13.0 mm). As the coupler 14 is rotated from the retracted position, it advances toward the first end surface 60 and the first thread set 40 of the first enlarged end 36. With each complete revolution of the coupler 14, the axial distance that the coupler moves will be equivalent to the lead length of the thread set 50 of the second enlarged end 38, and the gap 64 will be partially obstructed by the coupler 14 by a corresponding amount. Since the lead length is greater than the pitch of the thread set, the distance that the coupler 14 will move axially is greater than the distance that the coupler would move if the lead length was equal to the pitch. With another complete revolution, the coupler 14 will move in the axial direction by the distance of another lead length and the gap 64 will be further obstructed by the coupler 14, and so on.

By the time the coupler 14 has made approximately three and one-half revolutions, as illustrated in FIG. 6B, the first end of the coupler 14 is substantially coincident with the plane of the first end surface 60 and the link is effectively closed and access to the interior 78 is effectively prevented. From here, another revolution will further move the coupler 14 in an axial direction so that the internal thread set 92 begins to engage the thread set 40 of the first enlarged end 36. Finally, approximately one last revolution (more or less) will move the coupler 14 along the enlarged end 36 until it bottoms out against shoulder 32, as shown in FIG. 6C. At this point, the link assembly 10 is completely closed.

Figure 7A:
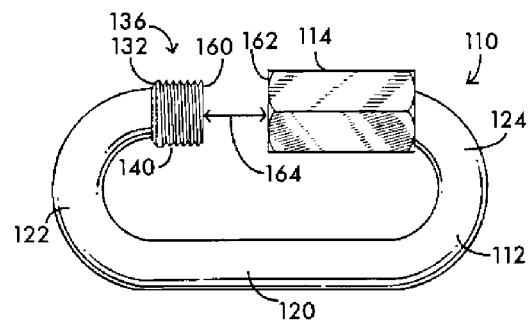
FIG. 7A is a side elevational view of a prior art link in a fully open first or retracted position.
Figure 7B:
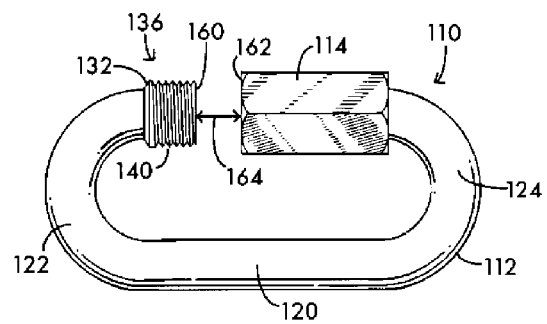
FIG. 7B is a side elevational view of the link of FIG. 7A after the coupler has been rotated approximately three complete revolutions in a clockwise direction when viewed from the second arcuate end; and, FIG. 7C is a side elevational view of the link of FIG. 7A after the coupler has been rotated approximately five complete revolutions in a clockwise direction when viewed from the second arcuate end; wherein the number of coupler revolutions has not yet been sufficient to close the link.
Figure 7C:
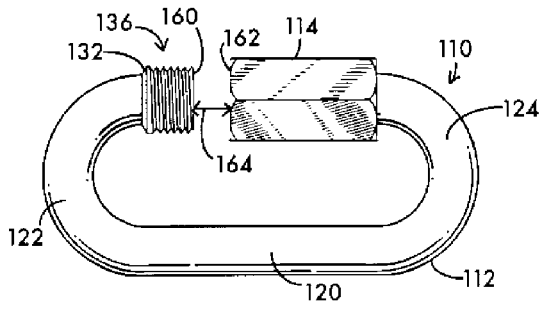

FIGS. 7A-7C illustrate a prior art link assembly 110 in various stages of closure as its coupler 114 is rotated. More specifically, FIG. 7A illustrates the link assembly 110 with a body 112, a center portion 120, arcuate portions 122, 124, enlarged ends 136, 138 (not shown), and a coupler 114, wherein the coupler 114 is in its retracted or open position. Here, the gap 164 formed between end surfaces 160, 162 of the enlarged ends 136, 138 is unobstructed and fully accessible (approximately 12.0 mm to approximately 13.0 mm). As the coupler 114 is rotated from the retracted position, it advances toward the first end surface 160 and the single thread 140 of the first enlarged end 136. With each complete revolution of the coupler 114, the axial distance that the coupler moves will be equivalent to the lead length of the single thread of the second enlarged end, and the gap 164 will be partially obstructed by the coupler 114 by a corresponding amount. Since the lead length of the prior art link assembly 110 is equal to the pitch of the thread set, the distance that the coupler 114 will move axially is the pitch. With another complete revolution, the coupler 114 will move in the axial direction by the distance of another lead length and the gap 164 will be further obstructed by the coupler 114, and so on.

After the coupler 114 has made approximately three and one-half revolutions, as illustrated in FIG. 7B, the first end of the coupler 14 has moved axially by a distance of approximately three and one-half times the pitch of the thread. The gap 164 has now been partially obstructed, but is still sufficiently large enough to permit access to the interior of the link assembly 110. Note that only about one-half of the gap 164 has been obstructed. In matching the revolutions of the coupler of FIGS. 6A-6C, another approximately two revolutions will further move the coupler 114 in an axial direction. Note that the gap 164 still is sufficiently large enough to permit access to the interior of the link assembly 110.

The juxtaposition of the preferred link assembly and the prior art link assembly of FIGS. 6A-6C and FIGS. 7A-7C, respectively, illustrates the significant advantage and speed of the preferred attachment link. Generally, fewer revolutions are required to move the coupler 14 of the FIGS. 6A-6C from its retracted or open position to its extended or closed position than with the coupler 114 of the prior art link assembly 110 of FIGS. 7A-7C. Expressed alternatively, the attachment link assembly 10 of FIGS. 6A-6C can be secured in the closed position approximately three times faster than the prior art link assembly 110 of FIGS. 7A-7C. The coupler 14 can be moved completely between the open (or retracted) and the closed (or extended) positions in approximately five revolutions, whereas the prior art coupler 114 requires approximately fifteen coupler 114 revolutions to move completely between the open (or retracted) and the closed (or extended) positions. As mentioned above, when the coupler 14 is rotated approximately three and one-half revolutions, access to the interior is effectively prevented. However, it should be apparent that the gap 64 can also be effectively closed in as little as three revolutions (when starting from the first or retracted position). The speed at which the link assembly 10 can be closed and opened is important for several reasons. By being able to close the link with fewer turns, the chance that the link will become compromised and become disconnected from an object is reduced. Conversely, by being able to open the link with fewer turns, the link can be quickly removed. The ability of the link to be rapidly closed and opened increases safety, particularly when speed is paramount. Closure speed is also important when the link is being used in inclement weather conditions such as rain, snow, cold, etc. Further, by requiring fewer turns, less time is required to securely close the link assembly and personal comfort can be increased. Further, if a user has to connect and disconnect many links, a reduction in the number of turns will reduce total number of repetitive motions that the user makes and reduce the possibility of injury due to the repetitive motions. It will be understood that the threads of the link assembly are conventionally right-handed so that when the coupler 14 is rotated in the clockwise direction it will extend toward the closed position and when the coupler 14 is rotated in the counter-clockwise direction it will retract and move toward the an open position. It will be further understood that the orientation of the threads may be reversed so that they are left-handed, so that when the coupler is rotated in the clockwise direction it will retract toward the open position, and when the coupler is rotated in the counter-clockwise direction it will extend toward the closed position.

The preferred embodiments may be manufactured from materials such as aluminum, carbon steel, alloy steel, stainless steel, or reinforced glass-filled plastic. However, stainless steel is preferred because of its strength and corrosion resistance.

Preferred link assemblies 10 of the present invention can be connected faster without sacrificing strength. One preferred link assembly manufactured of stainless steel was tested and the results of that test are indicated below in Table 1. In the tests, an attachment link was used to connect similarly dimensioned links segments of trailer safety chains. Tests were straight line, continuous pulls until failure, as opposed to non-destructive testing using dynamic and static loads. The stainless steel link assembly was used to connect confronting end links of two standardized trailer safety chain segments. The free ends of the chain segments were then connected to a fixture, with one free end connected to a static support on the fixture and the other free end connected to a tension unit that was connected to the fixture. In the first three tests, failure occurred at the links of the trailer safety chains, with an average force of around 5,895 kg (12,996 lb.).

The chain link size was then increased to a diameter of around 7.0 mm. (0.275 in.) and the grade was increased to G70. The free ends of the chain segments were connected together using the same size stainless steel link assembly as before, and subjected to the same testing as with the trailer safety chain. With these tests, failure occurred at the chain links in 8 of the 12 tests (about 66 percent of the time). The average force at the time of failure was around 6,881.8 kg (15,171.7 lb.).

Failure of the quick connect link occurred in 4 tests (about 33 percent of the time). In three of the failure modes the threads were stripped, which were stripped, and the average force of at the time of failure was around 6,122.2 kg (13,497.1 lb.). In the fourth quick connect failure, the threads held but the c-shaped body was sheared at one of the load contact points, with the force at failure around 6895.3 kg (15,201.5 lb). The average force at the time of failure for all of the four connector link failures was around 6,315 kg (13,923 lb), with a standard deviation of around 439 kg (969 lb).

TABLE 1

Testing of Stainless Steel Attachment Links of the Present Invention.
TESTING OF 5-TURN ATTACHMENT LINK

| TEST No. | CHAIN SEGMENTS | FAILURE LOAD (kg/m/s) | FAILURE LOAD (ft/lb/s) | FAILURE MODE |
|---|---|---|---|---|
| 1 | Std. Trailer Safety Chain | 5,935.1 kg | 13,084.6 lb | Chain link broken |
| 2 | Std. Trailer Safety Chain | 5,916.9 kg | 13,044.5 lb | Chain link broken |
| 3 | Std. Trailer Safety Chain | 5,833.3 kg | 12,860.2 lb | Chain link broken |
| 4 | Std. 7 mm dia. G70 Chain | 6,859.3 kg | 15,122,2 lb | Chain link broken |
| 5 | Std. 7 mm dia. G70 Chain | 6,877.3 kg | 15,161.8 lb | Chain link broken |
| 6 | Std. 7 mm dia. G70 Chain | 6,399.5 kg | 14,108.4 lb | Threads stripped |
| 7 | Std. 7 mm dia. G70 Chain | 6,919.3 kg | 15,254.4 lb | Chain link broken |
| 8 | Std. 7 mm dia. G70 Chain | 5,892.7 kg | 12,991.2 lb | Threads stripped |
| 9 | Std. 7 mm dia. G70 Chain | 6,937.3 kg | 15,294.1 lb | Chain link broken |
| 10 | Std. 7 mm dia. G70 Chain | 6,772.3 kg | 14,930.3 lb | Chain link broken |
| 11 | Std. 7 mm dia. G70 Chain | 6,967.3 kg | 15,360.2 lb | Chain link broken |
| 12 | Std. 7 mm dia. G70 Chain | 6,868.3 kg | 15,142.0 lb | Chain link broken |
| 13 | Std. 7 mm dia. G70 Chain | 6,895.3 kg | 15,201.5 lb | Quick link shear |
| 14 | Std. 7 mm dia. G70 Chain | 6,074.6 kg | 13,392.2 lb | Threads stripped |
| 15 | Std. 7 mm dia. G70 Chain | 6,853.3 kg | 15,108.9 lb | Chain link broken |

It should be noted that the breaking strength of the stainless steel quick connect coupling link was greater than the breaking strength of the similarly sized chain link segments that it was connecting together.

The foregoing is considered as illustrative only. Furthermore, since numerous modifications and changes will readily occur to those skilled in the art, the exact construction and operation shown and described is only an example of a preferred embodiment. The invention is defined by the following claims.

What is claimed is:

1. A link comprising:
an elongated body having a center portion, a first end and a second end, the first and second ends spaced apart from each other in a confronting relation, with each end having at least two threads, and with each thread extending away from the end in a helical direction; and
a coupler having a main section with first and second ends, with each end of the coupler configured and arranged to engage the threads of the first and second ends of the body, respectively.

2. The link of claim 1, wherein the coupler is movable between a first, retracted position and a second, extended position, wherein the first position exposes a gap between the first ends of the body and the coupler and the second position closes the gap between the first ends of the body and the coupler.

3. The link of claim 1, wherein the threads at each end of the body are external to the body.

4. The link of claim 1, wherein the ends of the body are spaced apart from each other by approximately 12.5 mm.

5. The link of claim 1, wherein the coupler has an internal surface with at least two threads starting that begin at the first end and which extend substantially along the length of the internal surface to the second end.

6. The link of claim 5, wherein the coupler has a generally cylindrical external surface.

7. The link of claim 6, wherein the external surface has at least one facet.

8. The link of claim 1, wherein the body is generally c-shaped.

9. A link comprising:
a body having a center portion, first and second arcuate portions extending from the center portion, and first and second ends extending from the first and second arcuate portions, the first and second ends spaced apart from each other, with each end having helical threads extending toward a respective arcuate portion; and
a coupler having a main section with first and second ends, with each end of the coupler configured and arranged to engage the first and second ends of the body, respectively;
wherein the threads of the respective ends of the body each have a lead length that is greater than the pitch length.

10. The link of claim 9, wherein the ratio of the lead length of the threads to the pitch of the threads is between two to five.

11. The link of claim 9, wherein the threads of the ends of the body are external threads.

12. The link of claim 9, wherein the ends of the body are enlarged relative to the arcuate portions from which they extend.

13. The link of claim 9, wherein the coupler is movable between a first, retracted position and a second, extended position, wherein the first position exposes a gap between the first ends of the body and the coupler and the second position closes the gap between the first ends of the body and the coupler.

14. A link comprising:
a body having a center portion, first and second arcuate portions extending from the center portion, and first and second ends extending from the first and second arcuate portions, the first and second ends spaced apart from each other so as to define a gap therebetween, with the ends having helical threads; and
a coupler having a main section with first and second ends, with each end of the coupler configured and arranged to engage the threads of the first and second ends of the body, respectively;
wherein the threads of the ends of the body have a lead angle that is greater than approximately 3.0 degrees and less than approximately 11.0 degrees.

15. The link of claim 14, wherein the threads of the ends of the body have a lead angle of between approximately 6.00 degrees and approximately 6.34 degrees.

* * * * *